J. R. HOLT & C. L. RIPPEY.
DIRIGIBLE FENDER.
APPLICATION FILED JUNE 3, 1914.
1,146,937. Patented July 20, 1915.
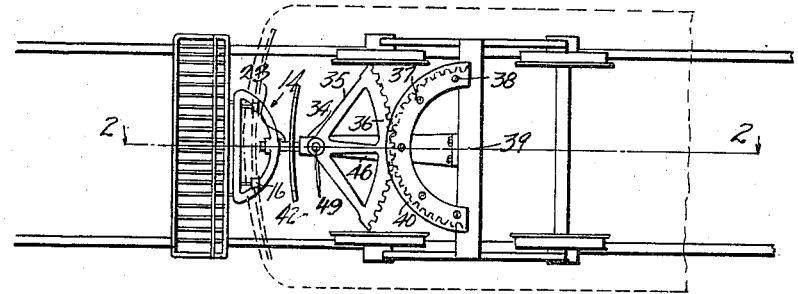
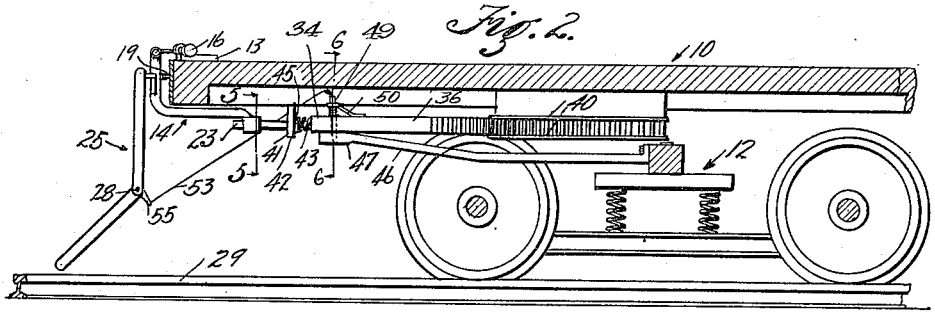
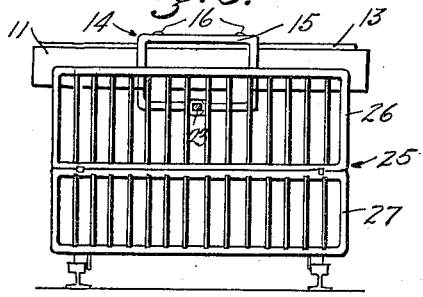
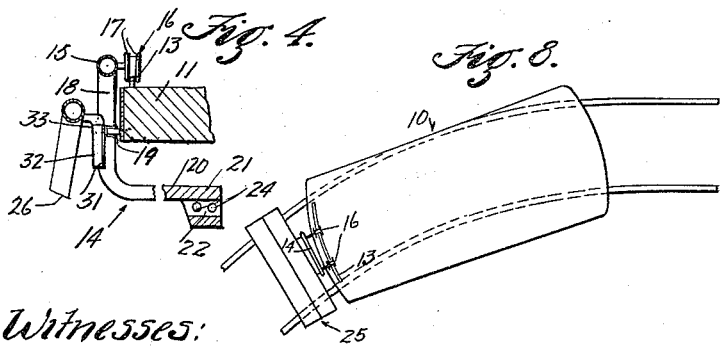
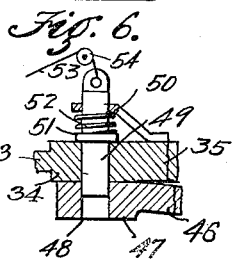
Witnesses:
James M. Abbott
Marguerite Bates
Inventors.
John R. Holt.
Clyde L. Rippey.
Harold Strauss
Attys.
COLUMBIA PLANOGRAPH CO., WASHINGTON, D. C.

UNITED STATES PATENT OFFICE.

JOHN R. HOLT AND CLYDE L. RIPPEY, OF LOS ANGELES, CALIFORNIA, ASSIGNORS OF ONE-THIRD TO ISAAC A. SMITH, OF LONG BEACH, CALIFORNIA.

DIRIGIBLE FENDER.

1,146,937.  Specification of Letters Patent.  Patented July 20, 1915.

Application filed June 3, 1914. Serial No. 842,625.

*To all whom it may concern:*

Be it known that we, JOHN R. HOLT and CLYDE L. RIPPEY, both citizens of the United States, residing at Los Angeles, in the county of Los Angeles, State of California, have invented new and useful Improvements in Dirigible Fenders, of which the following is a specification.

This invention relates to a dirigible fender.

It is the object of this invention to provide a fender for street cars and the like, which will automatically follow the curvature of the track so that the fender will extend over both rails when the car to which it is attached is traversing a curve, thus obviating the objectionable feature common in the ordinary constructions, namely, the fact that in turning a curve the fender on the forward end of the car is projected clear of the inner rail.

Another object is to provide an effective means controlled by the pivotal movement of the car truck and car body in relation to each other, whereby the fender on the forward end of the car will be caused to turn on a pivot in advance of the pivotal mounting of the truck and shift to one side or the other of the longitudinal center of the car according to which way the car turns on traversing a curve.

Another object is to provide a carriage on which the fender is detachably mounted and which carriage is shiftably supported on the car body and adapted to be operatively connected to the car truck, whereby it will be caused to move from side to side on turning of the truck in relation to the car body, and a further object is to provide means by which the folding of the fender will act to disconnect the carriage from its operative connection with the truck.

The invention is illustrated in the accompanying drawing, in which:

Figure 1 is a plan view, showing the manner of mounting the mechanism on the car body and illustrating the connection to the truck. Fig. 2 is an enlarged vertical section on the line 2—2 of Fig. 1, partly in elevation. Fig. 3 is a view in front elevation. Fig. 4 is an enlarged detail section of the fender supporting carriage showing the manner of mounting same on the car body. Fig. 5 is an enlarged detail section on the line 5—5 of Fig. 2. Fig. 6 is an enlarged detail section on the line 6—6 of Fig. 2, showing the device for throwing the carriage in and out of operative connection with the truck. Figs. 7 and 8 are diagrams illustrating the manner in which the fender follows the rails when the car traverses a curve.

More specifically, 10 indicates the car frame or body having the usual end sill 11, and which frame is pivotally supported at each end of a car truck 12 in the usual manner. Mounted on the end sill 11 is a horizontal track 13 curved to conform to the curvature of the sill, and which track forms a support for a carriage 14. This carriage may be constructed in any desired manner, and is here shown as comprising a head member 15 having a pair of spaced flanged rollers revolubly mounted on its rear face and which rollers engage the track 13 and are adapted to travel thereon, the flanges 17 on the rollers extending on opposite sides of the track 13 to prevent displacement of the rollers.

The head member 15 connects at its ends with depending hangers 18 which project in front of the sill 11 and are preferably provided with rollers 19, which bear against the front face of the sill 11 and serve to form an anti-friction bearing for the rearward thrust of the carriage. The hangers 18 connect at their lower ends with brackets 20, which converge toward each other beneath the car frame 10 and connect with a sleeve 21 having a rectangular opening adapted to receive the outer end of a rectangular bar 23, which is slidable longitudinally in relation to the sleeve 21.

Roller bearings 24 are interposed between the side walls of the opening 22 and the vertical sides of the bar 23 to reduce the frictional wear at this point and also prevent the binding of the bar in the sleeve.

The carriage 14 is provided as a support for a fender 25, which is here shown as comprising a vertical rear frame 26 to which a lower frame 27 is pivotally connected at 28, the frame 27 being adapted to be disposed at an inclination in relation to the frame 26 and to project forward thereof with its lower edge adjacent the track rails 29 on which the wheels 30 of the truck 12 travel. The lower frame 27 is limited in its downward movement in any desired manner and is adapted to be folded against the outer face of the frame 26 when the fender is not in use, as is common in ordinary fender constructions and operations.

The fender frames 26 and 27 are of a width slightly greater than the spacing of the rails 29 and adapted to be so mounted on the carriage 14, that when the latter is disposed centrally on the car, the ends of the fender member 27 will project a short distance beyond the outer faces of the rails 29.

The connection between the fender 25 and the carriage 14 is such as to permit of the ready removal of the fender when desired, and is here shown as comprising sockets 31 formed on the hangers 18 and downwardly extending pins 32 carried by the fender frame 26 which are adapted to be introduced into the sockets 31, collars 33 being formed on the pins 32 to limit their movement into the sockets and form a bearing and support for the frame 26, as particularly shown in Fig. 4.

The bar 23, which extends through the sleeve 21 in slidable contact therewith, constitutes an arm by which the carriage 14 is shifted from side to side and this bar 23 rigidly connects with a block 34 on which is a series of horizontally extending arms 35 carrying a toothed segment 36 on their ends. The segment 36 is thus integral with the block 34, which is pivoted to rock horizontally on a pin 49, carried by a bracket 46, as will be later described. This segment 36 is formed on a short radius and meshes with a toothed segment 37 formed on a smaller radius in relation to the radius of the segment 36. The segment 37 is rigidly mounted on the underside of the car frame 10 by means of bolts 38 or in any other suitable manner, and is arranged concentric with the pivotal connection 39 between the truck 12 and the car frame 10.

The segment 36 is supported by means of a flange 40 carried on the underside of the segment 37 and projecting beyond its outer edge beneath the segment 36. The bar 23 projects through a horizontally extending guide slot 41 formed in a hanger 42 depending from the frame 10, this hanger 42 forming a support for the bar 23 at a point adjacent the block 34. Interposed between the block 34 and the hanger 42 is a spring 43, which bears against the block 34 and a sleeve 45 spanning the slot 41 and engaging the face of the hanger 42 in slidable contact therewith, the spring 43 serving to crowd the toothed segment 36 against the segment 37 to maintain it in mesh therewith when the block 34 is disconnected from its pivotal bearing, as will presently appear.

The bearing for the block 34 comprises a bracket 46 rigidly mounted at one end on the truck 12 and extending forward thereof on its longitudinal center. The forward end of the bracket 46 is formed with a horizontally extending bearing plate 47 having an opening 48 centrally thereof to receive the lower end of a pivot pin 49 slidably mounted in the block 34 and extending therethrough, as particularly shown in Fig. 6. The upper end of the pin 49 passes through a bracket 50 carried by one of the arms 35, and interposed between the bracket and a shoulder 51 on the pin 49 is a spring 52, which operates to normally dispose the pin 49 in its lowermost position, the shoulder 51 engaging the upper face of the block 34 to limit the downward movement of the pin. Normally this pin is engaged with the opening 48 in the bearing plate 47 to form a pivotal mounting for the block 34 and its connections but is designed to be withdrawn from engagement with the bearing plate 47 to disconnect the block 34 therefrom, so that the bracket 46 may swing with the truck 12 when the latter turns on its pivot 39 without operating the fender shifting mechanism, which is a desirable provision where the fender on the rear of the car is folded to its inoperative position.

Means are provided for automatically disengaging the pin 49 on folding of the fender, which means is here shown as consisting of a cable 53, which is secured to the upper end of the pin 39 and passes over a direction roller 54, from whence it extends forward and downward and is connected at its outer end to an arm 55 carried on the lower fender frame 27 adjacent its pivot 28. By this arrangement, when the lower fender section 27 is raised to its folded position against the fender frame 26, a pull will be exerted on the cord or cable 53 to withdraw the pin 49 out of engagement with the bearing plate 47, in which position it is maintained in opposition to the spring 52 by the combined action of the cord 53 and the folded fender section 27 which will be locked in its folded position in any desired manner. The bracket 46 will then be free to swing with the truck 12 without operating the fender carrying mechanism when the fender is in its folded position. To reconnect the block 34 with the bearing plate 47, the carriage 14 is shifted on its track 13 until the opening in the block 34 is opposite the opening in the bearing plate 47, whereupon the fender section 27 is dropped to its lowermost position, thus relieving the pin 49 so that the spring 52 will operate to automatically force the pin into engagement with the bearing plate 47.

In the operation of the invention, when the pin 49 is engaged with the bearing plate 47, swinging movement of the bracket 46 with the truck 12 will cause the toothed rack 36 to travel over the rack 37, thereby turning the rack 36 on the pivot pin 49 in such manner as to cause the bar 23 to shift the carriage 14 on its track 13 in a direction corresponding to the direction of pivotal movement of the truck 12 in relation to the car body. This movement of the carriage 14 causes the fender 25 mounted thereon to follow the curvature of the track rails 29 traversed by the truck 12. The slidable connection of the rod 23 with the sleeve 21 allows for the movements of the bar 23 and the sleeve 21 over different arcs of travel and the bearings 24 permit of a longitudinal movement of the bar 23 on the sleeve 21 without binding.

The toothed segments 36 and 37 are so proportioned in relation to each other and to the length of the bracket 46 that the pivotal movement of the car truck 12 and the car frame 10 in relation to each other will effect a sufficient sidewise movement of the carriage 14 as to maintain the lower fender section 27 in such position that it will project over the inside rail of the track 29 when the car is traversing a curve, as shown in Figs. 7 and 8.

What we claim is:

1. In a dirigible fender for cars, the combination with a wheeled truck and car frame pivotally connected thereto, of a fender supporting carriage mounted to shift laterally on the car frame, and means controlled by the pivotal movement of the truck in relation to the car frame for shifting said carriage from side to side including a fixed toothed segment on the car frame, a pivoted toothed segment meshing therewith carried by the car truck, and a slidable connection between the pivoted segment and the carriage, whereby the turning of the segment will effect a shifting movement of the carriage.

2. In a dirigible fender for cars, the combination with a wheeled truck and car frame pivotally connected thereto, of a fender supporting carriage mounted to shift laterally on the car frame, and means controlled by the pivotal movement of the truck in relation to the car frame for shifting said carriage from side to side, including a stationary toothed segment on the car frame, a bracket on the truck, a pivoted toothed segment on said bracket engaging with the stationary toothed segment, and means whereby swinging movement of the bracket and toothed segment mounted thereon will effect a shifting movement of the carriage.

3. In a dirigible fender for cars, the combination with a wheeled truck and a car frame pivoted thereon, of a horizontal track on the car frame, a wheeled carriage adapted to travel on said track, a wheeled fender supporting carriage on said track, a toothed segment rigidly mounted on the car frame concentric with its pivotal connection with the truck, a bracket on the truck, a toothed segment pivoted on said bracket meshing with the before-mentioned toothed segment, a bar connected to said pivoted toothed segment, and a slidable connection between said bar and the fender carrying carriage.

4. In a dirigible fender for cars, the combination with a wheeled truck and a car frame pivoted thereon, of a horizontal track on the car frame, a wheeled carriage adapted to travel on said track, a wheeled fender supporting carriage on said track, a toothed segment rigidly mounted on the car frame concentric with its pivotal connection with the truck, a bracket on the truck, a toothed segment pivoted on said bracket meshing with the before-mentioned toothed segment, a bar connected to said pivoted toothed segment, and a slidable connection between said bar and the fender carrying carriage, and means for detachably connecting the pivoted segment to said bracket.

5. A dirigible fender for cars, comprising the combination with a wheeled truck and a car frame pivotally connected thereto, of a carriage mounted on the car frame to shift laterally thereon, a fender mounted on said carriage, a toothed segment rigidly mounted on the car frame concentric with its pivotal connection with the truck, an arm rigid on said truck and turnable therewith, a bearing plate on its outer end formed with an opening, a block, a pivot pin mounted in said block adapted to engage the opening in the bearing plate, a toothed segment carried by the block meshing with the first-named segment, a bar on said block and a slidable connection between said bar and the wheeled carriage.

6. A dirigible fender for cars, comprising the combination with a wheeled truck and a car frame pivotally connected thereto, of a carriage mounted on the car frame to shift laterally thereon, a fender mounted on said carriage, a toothed segment rigidly mounted on the car frame concentric with its pivotal connection with the truck, an arm rigid on said truck and turnable therewith, a bearing plate on its outer end formed with an opening, a block, a pivot pin mounted in said block adapted to engage the opening in the bearing plate, a toothed segment carried by the block meshing with the first-named segment, a bar on said block, a slidable connection between said bar and the wheeled carriage, and means for supporting the block independent of the bearing plate comprising a flange on the first-named toothed segment projecting under the other toothed segment, and a slotted hanger carried by the car frame engaging the bar.

In witness that we claim the foregoing we have hereunto subscribed our names this 14th day of May, 1914.

J. R. HOLT.
CLYDE L. RIPPEY.

Witnesses:
  MARGUERITE BATES,
  MARIE BATTEY.

Copies of this patent may be obtained for five cents each, by addressing the "Commissioner of Patents, Washington, D. C."